: US009046089B2

United States Patent
Tagami (10) Patent No.: US 9,046,089 B2
(45) Date of Patent: *Jun. 2, 2015

(54) WOBBLE PLATE TYPE VARIABLE DISPLACEMENT COMPRESSOR

(75) Inventor: Shinji Tagami, Sawa-gun (JP)

(73) Assignee: SANDEN CORPORATION, Gunma (JP)

( * ) Notice: Subject to any disclaimer, the term of this patent is extended or adjusted under 35 U.S.C. 154(b) by 1199 days.

This patent is subject to a terminal disclaimer.

(21) Appl. No.: 12/996,012

(22) PCT Filed: May 13, 2009

(86) PCT No.: PCT/JP2009/058904
§ 371 (c)(1),
(2), (4) Date: Dec. 2, 2010

(87) PCT Pub. No.: WO2009/147933
PCT Pub. Date: Dec. 10, 2009

(65) Prior Publication Data
US 2011/0088546 A1    Apr. 21, 2011

(30) Foreign Application Priority Data
Jun. 2, 2008   (JP) .................. 2008-144269

(51) Int. Cl.
*F04B 27/10* (2006.01)
*F04B 27/08* (2006.01)
(Continued)

(52) U.S. Cl.
CPC ......... *F04B 27/1072* (2013.01); *F04B 27/0895* (2013.01); *F04B 27/1063* (2013.01); *F04B 27/18* (2013.01); *F16D 3/24* (2013.01); *F16D 2250/00* (2013.01)

(58) Field of Classification Search
CPC .................................................. F04B 27/1072
USPC .......................................................... 92/12.2
See application file for complete search history.

(56) References Cited

U.S. PATENT DOCUMENTS 4,301,716 A    11/1981  Saegusa
5,055,004 A  * 10/1991  Ebbing et al. .................. 92/12.2
(Continued)

FOREIGN PATENT DOCUMENTS

DE       2331033      1/1975
GB        505535      5/1939
(Continued)

*Primary Examiner* — F. Daniel Lopez
(74) *Attorney, Agent, or Firm* — Cozen O'Connor (57) ABSTRACT

Disclosed is a wobble plate type variable displacement compressor that uses a constant velocity universal joint mechanism, which comprises an inner ring and an outer ring, balls that are held between guide grooves of the inner ring and the outer ring to transmit power, wherein a wobble plate is connected and fixed to the outer ring. In the compressor, the connecting structure for the outer ring and the wobble plate is formed by providing a plurality of concave portions arranged in a circumferential direction on one member, by plastically deforming the other member partially at locations corresponding to the concave portions such that it fits into the concave portions, and by fixing both members to each other in the axial direction and in the rotational direction by means of the plastic deformation. With this wobble plate type variable displacement compressor using the specified constant velocity universal joint mechanism, the structure for connecting the wobble plate and the outer ring in the wobble plate rotation preventing mechanism can be improved, thereby improving the productivity and reducing the cost and the weight.

7 Claims, 6 Drawing Sheets

(51) Int. Cl.
 *F04B 27/18* (2006.01)
 *F16D 3/24* (2006.01)

(56) References Cited

U.S. PATENT DOCUMENTS

| | | | |
|---|---|---|---|
| 5,106,271 A * | 4/1992 | Shimizu et al. | 417/269 |
| 5,112,197 A | 5/1992 | Swain et al. | |
| 5,129,752 A | 7/1992 | Ebbing et al. | |
| 5,231,914 A * | 8/1993 | Hayase et al. | 92/12.2 |
| 5,509,346 A | 4/1996 | Kumpf | |
| 8,327,751 B2 * | 12/2012 | Tagami | 92/12.2 |
| 8,549,985 B2 * | 10/2013 | Tagami | 92/71 |

FOREIGN PATENT DOCUMENTS

| | | |
|---|---|---|
| JP | 53-089949 | 2/1980 |
| JP | 64-15775 | 1/1989 |
| JP | 5-099137 | 4/1993 |
| JP | 5-202849 | 8/1993 |
| JP | 2006-200405 | 8/2006 |
| JP | 2008-138637 | 6/2008 |
| JP | 2009-162064 | 7/2009 |

* cited by examiner

WOBBLE PLATE TYPE VARIABLE DISPLACEMENT COMPRESSOR

RELATED APPLICATIONS

This is a U.S. National Phase Application under 35 USC §371 of International Application PCT/JP2009/058904 filed on May 13, 2009.

This application claims the priority of Japanese Patent Application No. 2008-144269 filed Jun. 2, 2008, the entire content of which is hereby incorporated by reference.

TECHNICAL FIELD OF THE INVENTION

The present invention relates to a wobble plate type variable displacement compressor, and specifically, to a wobble plate type variable displacement compressor which incorporates therein a new rotation preventing mechanism for the wobble plate.

BACKGROUND ART OF THE INVENTION

A wobble plate type variable displacement compressor is known wherein a rotational movement of a swash plate rotated together with a rotational main shaft and supported changeably in angle relative to the main shaft is converted into a wobble movement of a wobble plate, and by transmitting the wobble movement to a piston connected to the wobble plate, the piston is reciprocated. In such a wobble plate type variable displacement compressor, because it is necessary to prevent the rotation of the wobble plate connected to the piston, a rotation preventing mechanism of the wobble plate is incorporated. With respect to the rotation preventing mechanism of the wobble plate, various improvements for making the compressor small, improving the durability and the silent performance, facilitating processing, cost down, etc., have been investigated.

For example, in Patent documents 1, 3 and 4, a structure provided with a Birfield type constant velocity universal joint as a wobble plate rotation preventing mechanism is disclosed. In this structure, since wobble parts and a swash plate are supported by an outer ring of a Birfield type constant velocity universal joint provided as a wobble plate rotation preventing mechanism, and ultimately supported by a main shaft via a cage of an internal part of the constant velocity universal joint (a cage for regulating positions of a plurality of balls for performing power transmission), and further, via an inner ring of the constant velocity universal joint, the number of interposed parts increases and the accumulated play becomes great, and therefore, there is a problem insufficient in vibration, noise and durability.

Further, although the Birfield type constant velocity universal joint disclosed in Patent documents 1, 3 and 4 theoretically has a structure performing a rotational power transmission between inner and outer rings by a plurality of balls, actually it is difficult to achieve uniform and continuous contact of the plurality of balls, and therefore, a contact pressure of specified balls may locally increase. Further, because the rotational power transmission between inner and outer rings is performed in the shear direction of balls by ball guide grooves formed on each of inner and outer rings on both sides of a cage, the contact surface between the balls and the guide grooves may have a large inclination relative to the power transmission direction. By this, when a predetermined power is transmitted, the contact load generated as a vertical reaction force becomes high. Therefore, in order to ensure a sufficient transmission ability, it is necessary to employ a sufficiently large ball size (ball diameter), and from these reasons, it is difficult to make the structure further small-sized, and it is difficult to apply it to a small displacement compressor.

Further, since the support for the rotational main shaft of the compressor in the internal mechanism described in Patent documents 2, 3 and 4 is provided on one side relative to the main mechanism portion (a cantilever supporting is employed), whirling of the main shaft becomes great, and it is disadvantageous on durability, vibration and noise.

Further, in the compression mechanism disclosed in Patent documents 3 and 4, since the inner ring of the constant velocity universal joint is supported slidably in the axial direction at a condition being prevented with rotation, it is necessary to make the main shaft thick in order to ensure the rigidity of the main shaft provided to the housing to be sufficiently great, and it may cause increase of the weight of the main shaft and the weight of the product.

Further, in the constant velocity universal joint mechanism disclosed in Patent documents 3 and 4, machining of grooves for regulating the positions of a plurality of balls operating for power transmission is complicated, and the mechanism may be disadvantageous on cost.

Furthermore, in the compression mechanism disclosed in Patent document 2, since there is no support in the radial direction due to the main shaft in the main mechanism portion and play in the wobble portion in the radial direction tends to become great, by this play, problems on durability, vibration and noise may occur.

PRIOR ART DOCUMENTS

Patent Documents

Patent document 1: U.S. Pat. No. 5,112,197
Patent document 2: U.S. Pat. No. 5,509,346
Patent document 3: U.S. Pat. No. 5,129,752
Patent document 4: JP-A-2006-200405

SUMMARY OF THE INVENTION

Problems to be Solved by the Invention

Paying attention to the problems in the above-described conventional technologies, a wobble plate type variable displacement compressor is previously proposed by the applicant of the present invention which uses a constant velocity universal joint small-sized, good in durability and silent performance, easy-to-machine and inexpensive, that has achieved to realize uniform and continuous contact of a plurality of balls operating for power transmission while suppressing play in the radial direction and rotational direction of the inside of the constant velocity universal joint provided as a wobble plate rotation preventing mechanism (Japanese Patent Application No. 2006-327988).

In this proposal, as the rotation preventing mechanism of the wobble plate, a mechanism is provided, which comprises (a) an inner ring provided in a housing movably in an axial direction although rotation is prevented, supporting a rotational main shaft via a bearing at an inner diameter portion to rotate relatively and to move relatively in an axial direction and having a plurality of guide grooves for guiding a plurality of balls provided for power transmission, (b) a sleeve functioning as a wobble central member of the wobble movement of the wobble plate, provided on the rotational main shaft to rotate relatively thereto and to move in an axial direction and engaged with the inner ring movably in an axial direction together with the inner ring, (c) an outer ring having a plurality of guide grooves for guiding the balls at positions opposing respective guide grooves of the inner ring, supported on the sleeve wabblingly, supporting the wobble plate fixedly on an outer circumference and supporting the swash plate rotatably via a bearing, and (d) a plurality of balls held by the guide grooves formed in the inner ring and the outer ring at a condition of opposing each other and performing power transmission by being compressed between the guide grooves.

By this proposal, a wobble plate type variable displacement compressor made small-sized, good in durability and silent performance, easy-to-machine and inexpensive, has become possible, but, even in this proposed mechanism, a matter to be further improved is still left. Namely, in the above-described previous proposal, the rotation of the wobble plate is prevented by being fixed integrally to the outer ring of the rotation preventing mechanism, which is fitted into the inner circumferential portion of the wobble plate. As the fixing method in this connecting structure between the wobble plate and the outer ring, it is performed by press fitting between the cylindrical surface formed on the outer circumference of the outer ring of the rotation preventing mechanism and the cylindrical surface formed on the inner circumference of the wobble plate. However, in the fixing due to such a press fitting, a looseness may occur by a difference between coefficients of linear expansion of materials used for the respective members (for example, an iron-based material for the outer ring, an aluminum-based material for the wobble plate) and by variation in temperature, and by this, a sufficient fitting length or fitting diameter becomes necessary, and therefore, an increase of the size of the mechanism, and further, an increase of the weight, are caused. Further, in order to ensure both of sufficient fitting holding force and assembling performance, it is necessary to manage the respective fitting diameters precisely, and for achieving this, surface treatment, re-processing after heat treatment, etc. are required, and therefore, a reduction in productivity ascribed to a complicated manufacturing process, ultimately, an increase in cost for processing parts, are also caused.

Accordingly, paying attention to the problem left in the above-described new wobble plate rotation preventing mechanism using a specified constant velocity universal joint mechanism which was previously proposed by the applicant of the present invention, an object of the present invention is to provide a wobble plate type variable displacement compressor which can improve the connecting structure between the wobble plate and the outer ring in the rotation preventing mechanism and which can improve the productivity and reduce the cost and the weight.

Means for Solving the Problems

To achieve the above-described objects, a wobble plate type variable displacement compressor according to the present invention has pistons inserted reciprocally into cylinder bores, a swash plate rotated together with a rotational main shaft and supported changeably in angle relative to the main shaft, a wobble plate which is connected to the pistons, in which a rotational movement of the swash plate is converted into a wobble movement of the wobble plate, and which transmits the wobble movement to the pistons to reciprocate the pistons, and a rotation preventing mechanism of the wobble plate, and is characterized in that the rotation preventing mechanism of the wobble plate comprises (a) an inner ring provided in a housing movably in an axial direction while being prevented with rotation and having a plurality of guide grooves for guiding a plurality of balls provided for power transmission, (b) an outer ring having a plurality of guide grooves for guiding the balls at positions opposing respective guide grooves of the inner ring, and connected with the wobble plate on an outer circumference of the outer ring and supported wobblingly together with the wobble plate, and (c) a plurality of balls held by the guide grooves formed in the inner ring and the outer ring at a condition of opposing each other and performing power transmission by being compressed between the guide grooves, and a structure for connecting the outer ring and the wobble plate is formed by providing a plurality of concave portions arranged in a circumferential direction on one member, plastically deforming the other member partially at locations corresponding to the concave portions such that it fits into the concave portions, and fixing both members to each other in an axial direction and in a rotational direction by means of the plastic deformation. Where, the outer ring may be structured so as to rotatably support the swash plate via a bearing. Alternatively, the swash plate may be structured so as to be supported rotatably by the wobble plate via a bearing. Further, the inner ring can support the rotational main shaft at its inner diameter portion, so that the main shaft can rotate relatively and can move relatively in the axial direction.

In the rotation preventing mechanism of the wobble plate thus constructed, first, the outer ring of the rotation preventing mechanism is supported wobblingly together with the wobble plate, and the wobble plate rotation preventing mechanism is formed via the guide grooves opposing each other, formed on the inner and outer rings, and the balls held between the guide grooves. Then, the inner ring is supported in the housing movably in the axial direction and prevented with rotation, and by the inner diameter portion of this inner ring, for example, by the bearing provided in the inner diameter portion, the rotational main shaft, for example, the rear end portion of the rotational main shaft, is supported. Therefore, the rotational main shaft is rotatably supported at both sides of the compression main mechanism portion (that is, inboard type supporting), a sufficiently high rigidity can be easily ensured, the whirling of the main shaft may be suppressed small, and therefore, it becomes possible to make the diameter of the main shaft small, improve the reliability and reduce vibration and noise. Further, because the whirling of the main shaft is suppressed, the deflection of the swash plate rotated together with the main shaft may be suppressed small, and the rotational balance of the whole of the rotational portion may be improved. Further, by optimizing the formation of the guide grooves formed on the inner ring and the outer ring which oppose each other, uniform and continuous contact of the balls held between the guide grooves becomes possible, and therefore, it becomes possible to improve the reliability and reduce vibration and noise. Furthermore, the guide grooves of balls may be formed so that balls can roll between a pair of guide grooves separated from each other accompanying with the movement of the intersection of both guide grooves, complicated shapes are not required for the guide grooves themselves, and therefore, the machining therefor is facilitated and becomes advantageous on cost. In such a structure according to the present invention, basically, the plurality of balls operating for power transmission perform power transmission at a condition where they are nipped and supported between guide grooves facing to each other in the compression direction. By this, an actual contact area can be ensured sufficiently large, it becomes possible to reduce the contact surface pressure, and it becomes advantageous on reliability. Further, because the contact surface pressure can be reduced, it becomes possible to make the diameter of balls small and it becomes also possible to make the whole of the rotation preventing mechanism small-sized.

Then, the connecting structure between the outer ring and the wobble plate in the above-described wobble plate rotation preventing mechanism is formed by providing a plurality of concave portions arranged in the circumferential direction on one member, plastically deforming the other member partially at locations corresponding to the concave portions such that it fits into the concave portions (namely, by caulking the other member at locations corresponding to the concave portions), and fixing both members to each other in an axial direction and in a rotational direction by means of the plastic deformation (by the caulking). In the connection fixing structure between the outer ring and the wobble plate due to this plastic deformation (caulking), as compared with the connection fixing due to press fitting in the previously proposed structure, high accuracy of parts for the press fitting is not required, and the manufacture is facilitated and the productivity is improved. Further, because surface treatment or re-processing after heat treatment can also be made unnecessary, the manufacturing process is simplified, and reduction of the cost for processing parts may be possible. Further, since both members are fixed to each other via plastic deformation (caulking), a large fitting length as in the previously proposed structure is not necessary, the parts can be made small-sized, and therefore, a reduction of weight, a further reduction of cost, may become possible. Furthermore, both members can be fixed to each other more securely via the plastic deformation (caulking), and the fixing strength may be increased. Via such secure connection and fixing, the wobble plate is operated together with the outer ring, and its rotation can be surely prevented.

In this wobble plate type variable displacement compressor, a structure may be employed wherein the inner ring in the above-described wobble plate rotation preventing mechanism slides directly on the rotational main shaft in the axial direction, and a structure may also be employed wherein the inner ring slides via a sleeve. In the latter case, a structure may be employed wherein the above-described wobble plate rotation preventing mechanism further comprises (d) a sleeve functioning as a wobble central member of the wobble movement of the wobble plate, provided on the rotational main shaft to rotate relatively thereto and to move in the axial direction and engaged with the inner ring movably in the axial direction together with the inner ring, and the above-described outer ring is supported wobblingly on the sleeve.

In such a wobble plate type variable displacement compressor according to the present invention, a structure may be employed wherein the guide grooves opposing each other of the inner ring and the outer ring of the above-described wobble plate rotation preventing mechanism are formed at a relative angle of 30 to 60 degrees relative to a center axis of the rotational main shaft, and guide grooves opposing each other for forming a single ball guide are disposed so as to be symmetric relative to a plane perpendicular to the main shaft and passing through a wobble center of the wobble plate at a condition where a relative angle between an axis of the inner ring and an axis of the outer ring is zero. By the structure where the guide grooves opposing each other are disposed at a crossed axes angle within a predetermined range and both guide grooves formed in the directions crossed with each other are disposed symmetrically relative to the plane passing through the wobble center of the wobble plate, it becomes possible that the balls held between the guide grooves are brought into contact with both guide grooves at a uniform and continuous condition, the vibration and noise at this portion may be greatly reduced, and the reliability may be greatly improved.

Further, in this constitution, a structure may be employed wherein two ball guides adjacent to each other among a plurality of ball guides of the above-described rotation preventing mechanism are referred to be a pair of ball guides, and the pair of ball guides are disposed in parallel to each other. By such a structure, because the play in the rotational direction in the rotation preventing mechanism portion is schematically decided by a relationship between the distance between the bottoms of the pair of guide grooves provided on the inner and outer rings and the diameter of the balls, setting and management of an actual clearance between the bottoms of the guide grooves and the balls are facilitated, and it becomes possible to suppress the play to be small by setting a proper clearance.

In this constitution, a structure may be employed wherein the pair of ball guides disposed in parallel to each other are disposed symmetrically relative to a plane including a center axis of the rotational main shaft, and a structure also may be employed wherein a guide groove forming one ball guide of the pair of ball guides, which are disposed in parallel to each other, is disposed so that its axis is positioned on a plane including a center axis of the rotational main shaft. In the former structure, a rotation preventing mechanism, in which a rotational direction may not be selected, can be formed, and it becomes possible to reduce the contact load of the balls, and in the latter structure, it becomes possible to further reduce the contact load by setting the power transmission direction at a specified direction.

Further, in the above-described wobble plate rotation preventing mechanism, a structure may be employed wherein two ball guides disposed on both sides of the rotational main shaft approximately symmetrically relative to the rotational main shaft among the plurality of ball guides are referred to be a pair of ball guides, and the pair of ball guides are disposed in parallel to each other. By this structure, because the play in the rotational direction in the rotation preventing mechanism portion is schematically decided by a relationship between the distance between the bottoms of the pair of guide grooves provided on the inner and outer rings and the diameter of the balls, it becomes possible to set and manage actual clearances in both ball guides simultaneously at desirable clearances, by disposing two ball guides symmetrically disposed in parallel to each other. As a result, the setting and management of the clearances are facilitated, and it becomes possible to suppress the play to be small.

In this structure, it is preferred that the above-described pair of ball guides, which are disposed in parallel to each other, are disposed so that axes of guide grooves forming the pair of ball guides are positioned on a plane including a center axis of the rotational main shaft. By disposing the pair of ball guides on the plane including the center axis of the rotational main shaft, it becomes possible to minimize the ball contact load without selecting the power transmission direction.

Effect According to the Invention

Thus, in the wobble plate type variable displacement compressor according to the present invention, as compared with the wobble plate rotation preventing mechanism using the conventional constant velocity universal joint, uniform and continuous contact of a plurality of balls operating for power transmission can be achieved while the play can be suppressed small, a rotation preventing mechanism small-sized, excellent in durability and silent performance, good in rotational balance, easy in machining and inexpensive can be realized, and a wobble plate type variable displacement compressor, having an excellent performance which has not been achieved by the conventional technologies, can be provided. And, in the connecting portion between the outer ring and the wobble plate in the wobble plate rotation preventing mechanism of this compressor, by plastically deforming (caulking) the other member at locations corresponding to a plurality of concave portions provided on one member and fixing both members to each other in the axial direction and in the rotational direction, manufacture of parts can be facilitated, and improvement of the productivity, making parts small-sized, reduction of the weight and reduction of the cost can be realized.

BRIEF EXPLANATION OF THE DRAWINGS

FIG. 8 (A) is a plan view of the wobble plate and the outer ring connected to each other, depicted in FIG. 7, FIG. 8 (B) is a sectional view as viewed along the line X-X of FIG. 8 (A), and FIG. 8 (C) is an enlarged sectional view of the portion C of FIG. 8 (B).

EMBODIMENTS FOR CARRYING OUT THE INVENTION

Hereinafter, embodiments of the present invention will be explained referring to figures.

First, in order to understand a new wobble plate rotation preventing mechanism in a wobble plate type variable displacement compressor according to the present invention, an embodiment of the basic structure of the whole of this wobble plate type variable displacement compressor will be explained referring to FIGS. 1-5, and next, for the embodiment of this basic structure, with respect to a structure improved by the present invention, in particular, a connecting structure between an outer ring and a wobble plate, FIGS. 6-8 will be explained.

Figure 1:
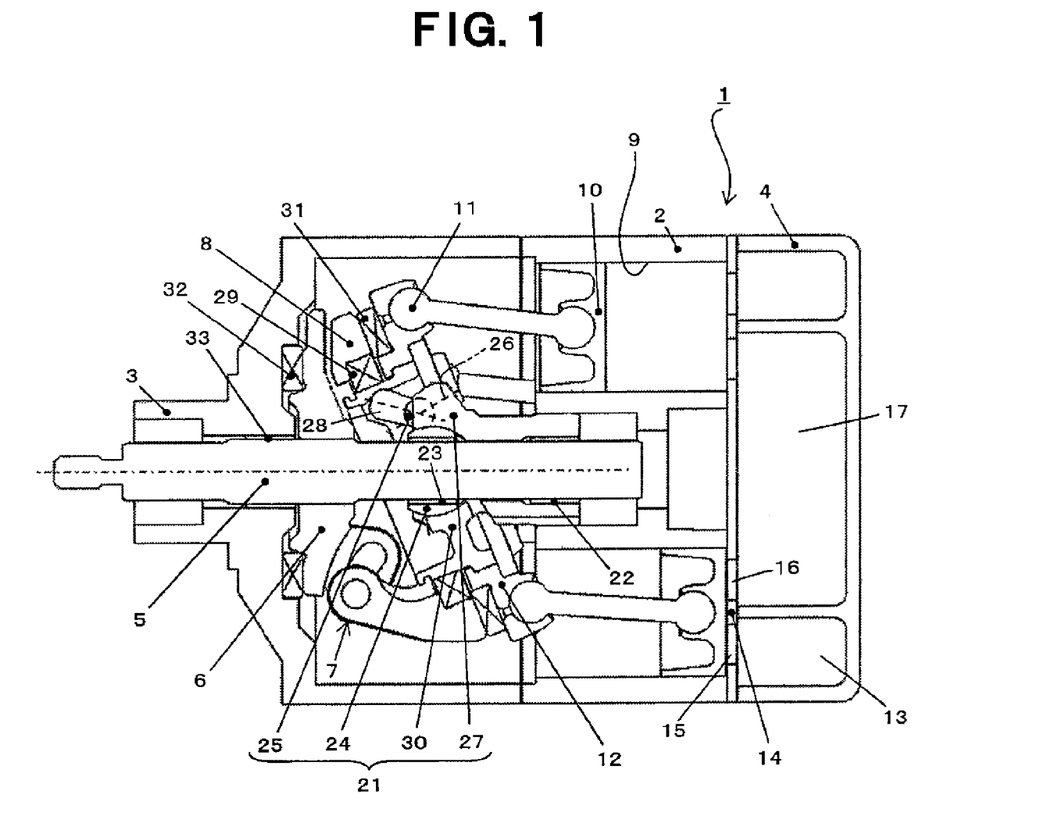
FIG. 1 is a vertical sectional view of a compressor showing an example of a basic structure of a wobble plate type variable displacement compressor having a wobble plate rotation preventing mechanism in the present invention.
Figure 2:
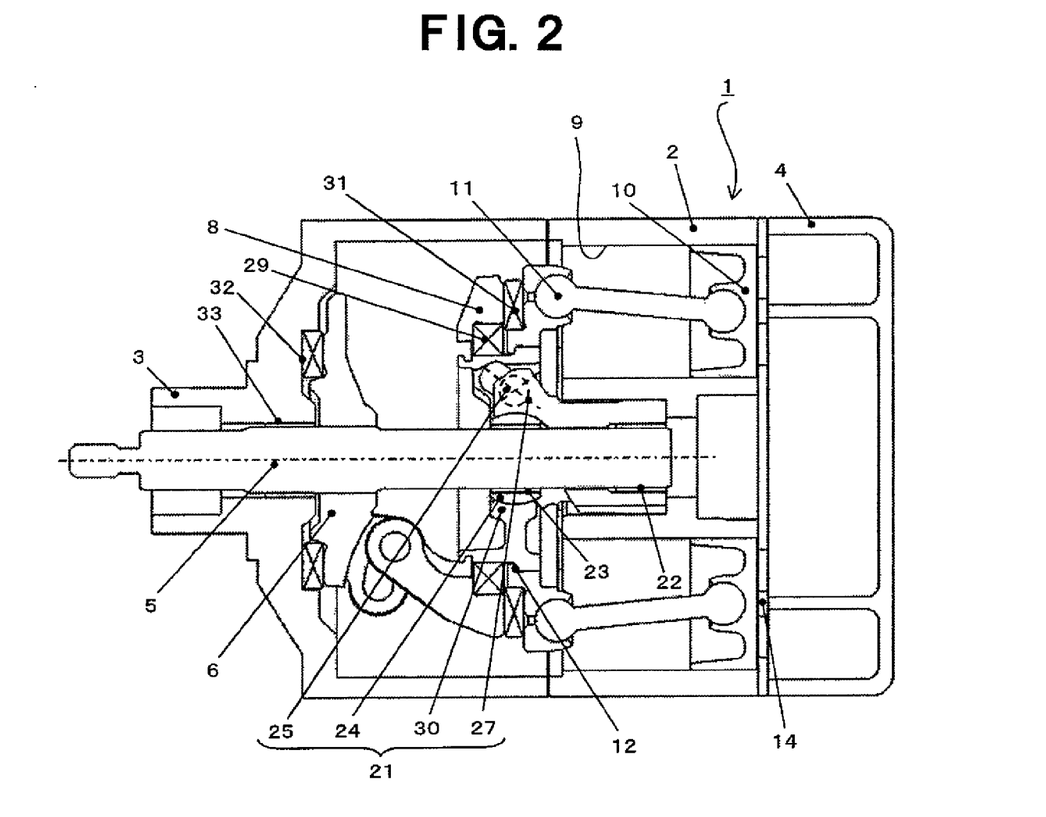
FIG. 2 is a vertical sectional view of the wobble plate type variable displacement compressor depicted in FIG. 1, showing an operational condition different from that depicted in FIG. 1.
Figure 3:
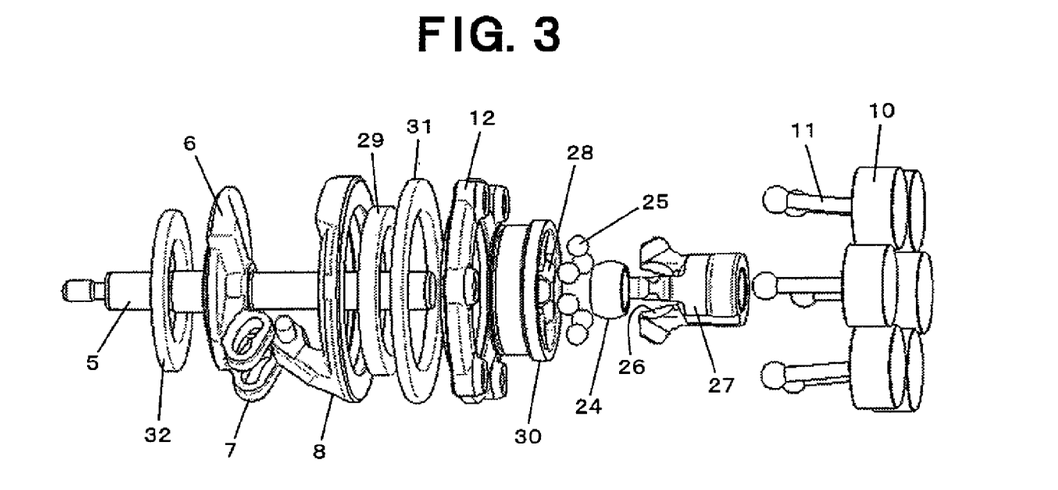
FIG. 3 is an exploded perspective view of a main portion including a wobble plate rotation preventing mechanism of the wobble plate type variable displacement compressor depicted in FIG. 1.

FIG. 1 shows an example of a basic structure of the whole of a wobble plate type variable displacement compressor having a wobble plate rotation preventing mechanism according to the present invention, and shows its entire structure in the operation state at the condition of the displacement achieving its maximum discharge. FIG. 2 shows the operation state of the wobble plate type variable displacement compressor depicted in FIG. 1 at the condition of the displacement achieving its minimum discharge. FIG. 3 shows a main portion including a wobble plate rotation preventing mechanism in the wobble plate type variable displacement compressor according to the embodiment of the basic structure depicted in FIG. 1, as an exploded perspective view.

In FIGS. 1 and 2, a wobble plate type variable displacement compressor 1 has a housing 2 disposed at the central portion, a front housing 3 and a rear housing 4 disposed on both sides of the housing 1 as its housings, and a rotational main shaft 5 inputted with a rotational drive power from outside is provided over the range from the portion of housing 2 up to the position extending through front housing 3. A rotor 6 is fixed to rotational main shaft 5 so as to be rotated integrally with main shaft 5, and a swash plate 8 is connected to rotor 6 via a hinge mechanism 7, changeably in angle and rotatably together with rotational main shaft 5. Piston 10 is reciprocally inserted into each cylinder bore 9, and piston 10 is connected to wobble plate 12 via connecting rod 11. The rotational movement of swash plate 8 is converted into the wobble movement of wobble plate 12, the wobble movement is transmitted to piston 10 via connecting rod 11, and piston 10 is reciprocated. Fluid to be compressed (for example, refrigerant) is sucked from suction chamber 13 formed in rear housing 4 into cylinder bore 9 through suction hole 15 formed on valve plate 14 (a suction valve is omitted in the figure) accompanying with the reciprocating movement of piston 10, and after the sucked fluid is compressed, the compressed fluid is discharged into discharge chamber 17 through discharge hole 16 (a discharge valve is omitted in the figure), and therefrom, sent to an external circuit.

It is necessary that the above-described wobble plate 12 performs a wobble movement at a condition where its rotation is prevented. Hereinafter, the remaining portions of compressor 1 will be explained mainly with respect to the rotation preventing mechanism of this wobble plate 12, referring to FIGS. 1 to 3.

Rotation preventing mechanism 21 of wobble plate 12 is formed from a mechanism comprising (a) an inner ring 27 provided in housing 2 movably in the axial direction although its rotation is prevented, supporting rotational main shaft 5 via a bearing 22 (radial bearing) at its inner diameter portion to rotate relatively and to move relatively in the axial direction and having a plurality of guide grooves 26 for guiding a plurality of balls 25 provided for power transmission, (d) a sleeve 24 functioning as a wobble central member of the wobble movement of wobble plate 12, provided on rotational main shaft 5 to rotate relatively thereto and to move in the axial direction and engaged with inner ring 27 movably in the axial direction together with inner ring 27, (b) an outer ring 30 having a plurality of guide grooves 28 for guiding balls 25 at positions opposing respective guide grooves 26 of inner ring 27, supported on sleeve 24 wabblingly, connected with wobble plate 12 fixedly on its outer circumference and supporting swash plate 8 rotatably via a bearing 29 (radial bearing), and (c) a plurality of balls 25 held by guide grooves 26, 28 formed in inner ring 27 and outer ring 30 at a condition of opposing each other and performing power transmission by being compressed between guide grooves 26, 28. Thrust bearings 31, 32 are interposed between wobble plate 12 and swash plate 8 and between rotor 6 and front housing 3, respectively. Further, although inner ring 27 is supported in housing 9 movably in the axial direction, its rotation is prevented. As means for preventing the rotation, a general rotation regulating means such as a key or a spline may be used (not depicted). Furthermore, although the rear end of rotational main shaft 5 is supported by bearing 22 provided on the inner diameter portion of inner ring 27, because rotational main shaft 5 is supported also at the side of front housing 3 through the compression main mechanism portion rotatably via bearing 33 (radial bearing), it is radially supported on both sides (inboard supporting).

In rotation preventing mechanism 21 of wobble plate 12 constructed as described above, outer ring 30 is wabblingly supported by sleeve 24 through the spherical surface contact, and sleeve 24 is supported by rotational main shaft 5 rotatably and movably in the axial direction, and by this structure, it is possible to make play in the radial direction between rotational main shaft 5 and the whole of the wobble mechanism portion small, thereby improving the reliability and reducing vibration and noise.

Further, in the above-described embodiment, since rotational main shaft 5 is supported in the condition of inboard supporting on both sides of the compression main mechanism portion by bearing 22 provided in the inner diameter portion of inner ring 27 and bearing 33 provided on front housing 3 side, a sufficiently high rigidity can be ensured even if the diameter of main shaft 5 is relatively small, the whirling of main shaft 5 can also be suppressed, making small-sized can be easily achieved, and improvement of reliability and reduction of vibration and noise may be possible. Further, as the result of suppressing the whirling of rotational main shaft 5, the whole of the rotational portion rotated together with rotational main shaft 5 can be suppressed to be small, and therefore, the rotational balance of the whole of the rotated portion becomes remarkably good. Where, in the above-described structure, it is possible to extend rotational main shaft 5 rearward and to replace it for a structure being supported directly by housing 2 via a bearing.

Moreover, in the above-described embodiment, by the engagement of the spherical surface (concave spherical surface) formed in the inner diameter side of inner ring 27 with the spherical surface (convex spherical surface) formed in the outer diameter side of sleeve 24, a mutual supporting between both members is performed. By adjusting a clearance in this supporting portion, it is possible to absorb a relative whirling of the inner and outer rings caused by the dispersion of the positions of the guide grooves for a plurality of balls operating for power transmission, whereby the uniform and continuous contact of balls 25 is further improved, and it is more advantageous with respect to reliability, vibration and noise.

Figure 4:
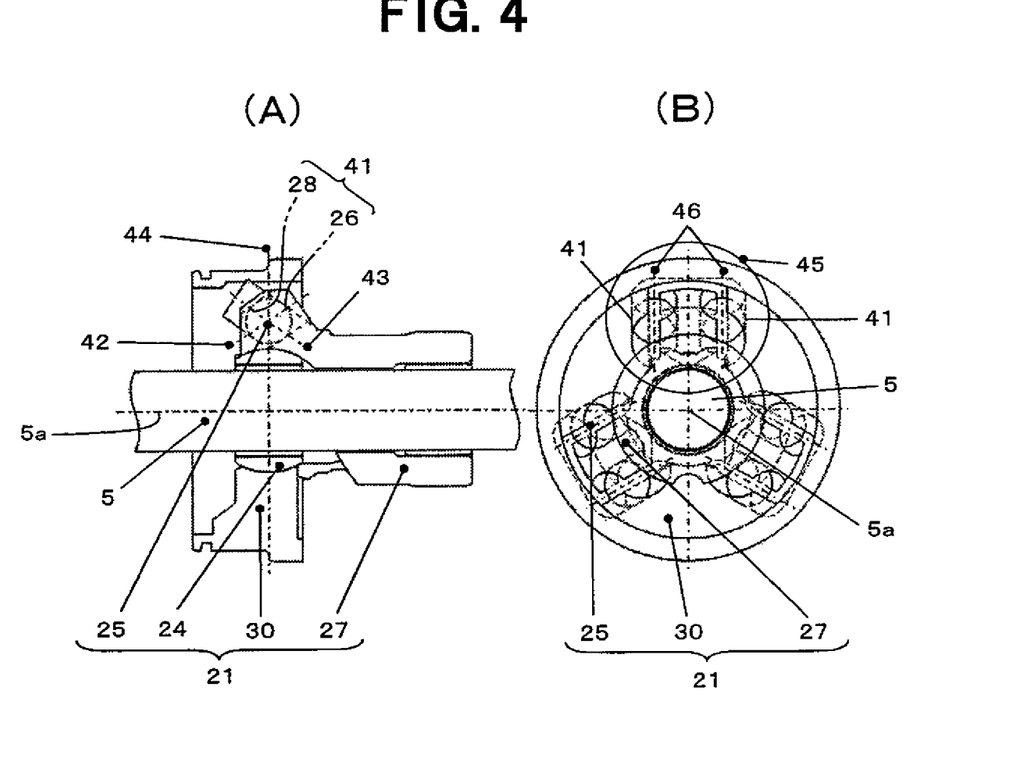
FIG. 4 shows an example of the structure of the wobble plate type variable displacement compressor depicted in FIG. 1, FIG. 4 (A) is a partial, vertical sectional view thereof, and FIG. 4 (B) is a partial elevational view thereof.

FIG. 4 shows a condition where the relative angle between the inner and outer rings is zero in rotation preventing mechanism 21 of wobble plate 12. As depicted in FIG. 4(A), guide grooves 26, 28 formed on inner ring 27 and outer ring 24 of rotation preventing mechanism 21 are disposed at relative angles (relative angles within a range of 30 to 60 degrees) relative to the center axis of rotational main shaft 5. Guide groove 26 formed on inner ring 27 (the axis of guide groove 26 is indicated by symbol 42) and guide groove 28 formed on outer ring 30 (the axis of guide groove 28 is indicated by symbol 43), which form one ball guide 41 and oppose each other, are disposed so as to be symmetric relative to plane 44 which is perpendicular to rotational main shaft 5 and passes through the wobble center of wobble plate 12, at a condition where the relative angle between the axis of inner ring 27 and the axis of outer ring 30 is zero. Ball 25 is regulated and supported on the intersection of axis 42 of guide groove 26 and axis 43 of guide groove 28. Further, as depicted in FIG. 4(B), a structure can be employed wherein two ball guides adjacent to each other among a plurality of ball guides 41 of rotation preventing mechanism 21 are referred to be a pair of ball guides, and respective ball guides 41 in the pair of ball guides 45, in other words, axes 46 of the guide grooves formed on the inner and outer rings in this portion, are disposed in parallel to each other. In such a structure, as aforementioned, because the play in the rotational direction in the rotation preventing mechanism portion is schematically decided by a relationship between the distance between the bottoms of the pair of guide grooves provided on the inner and outer rings and the diameter of the balls, setting and management of an actual clearance are facilitated, and it becomes possible to suppress the play to be small by setting a proper clearance. A plurality of balls 25 operating for power transmission are supported in the compression direction between guide grooves 26, 28 facing each other through the respective balls, and perform power transmission. Since ball 25 is held by guide grooves 26, 28 facing each other so as to be embraced and come into contact with both guide grooves 26, 28, the contact area between ball and the respective guide grooves 26, 28 may be ensured to be sufficient large, it becomes possible to reduce the contact surface pressure, and a structure remarkably advantageous in reliability, vibration and silent performance may be realized. Further, it is also possible to make the diameter of balls 25 small, and the whole of the rotation preventing mechanism may be made small.

Figure 5:
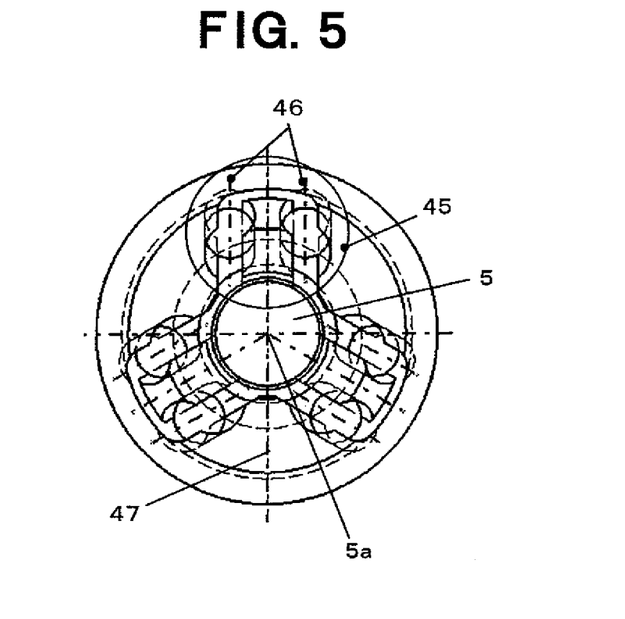
FIG. 5 is a partial elevational view showing another example of the structure of the wobble plate type variable displacement compressor depicted in FIG. 1.

Further, the load applied to ball, which is provided as a moment whose center is rotational main shaft 5, is generated as a perpendicular reaction force of the actual contact surface. The smaller the inclination of the normal line of the contact surface relative to the direction of the moment is, the smaller the contact load becomes, and as depicted in FIG. 5, by a structure where the pair of ball guides 45 disposed in parallel as described above are disposed symmetrically relative to plane 47 including center axis 5a of rotational main shaft 5, in other words, by a structure where axes 46 of two sets of guide grooves formed on the inner and outer rings are disposed symmetrically relative to plane 47 including center axis 5a of rotational main shaft 5, the mechanism is made as a rotation preventing mechanism which does not select the rotational direction, and it is possible to minimize the ball contact load.

Figure 6:
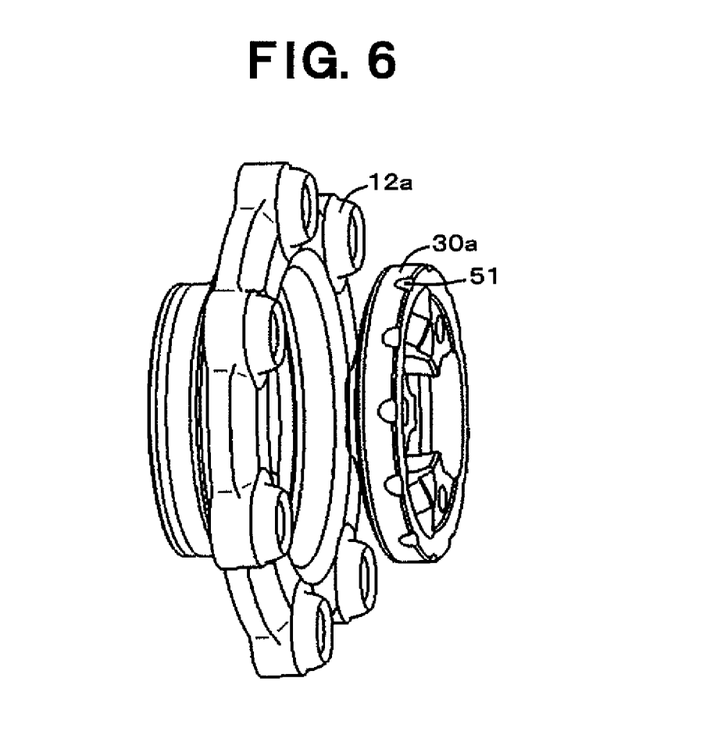
FIG. 6 is an exploded perspective view of a wobble plate and an outer ring showing an example added with improvement according to the present invention with respect to the connecting structure between the wobble plate and the outer ring in the wobble plate rotation preventing mechanism in the wobble plate type variable displacement compressor depicted in FIG. 1.
Figure 7:
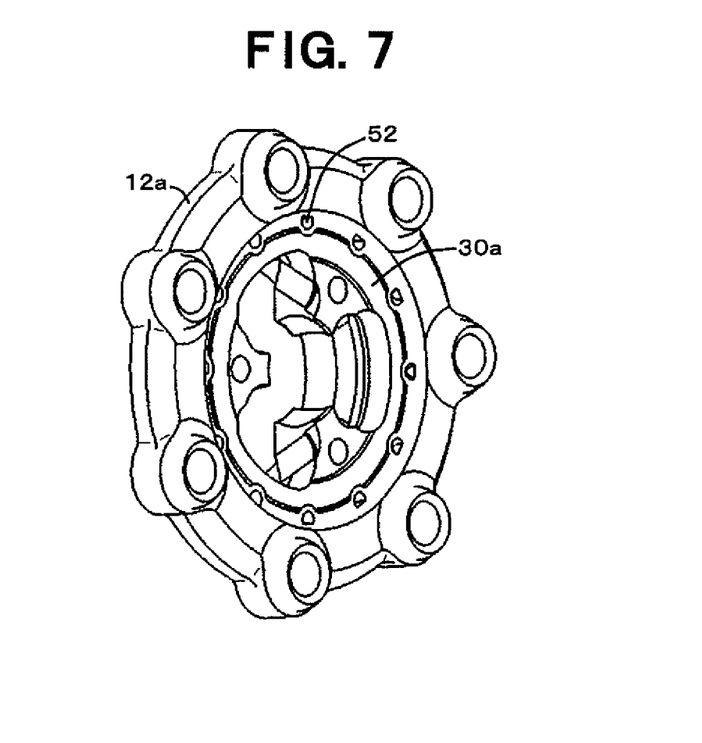
FIG. 7 is a perspective view of the wobble plate and the outer ring in case where the wobble plate and the outer ring depicted in FIG. 6 are connected to each other via a structure according to the present invention.
Figure 8:
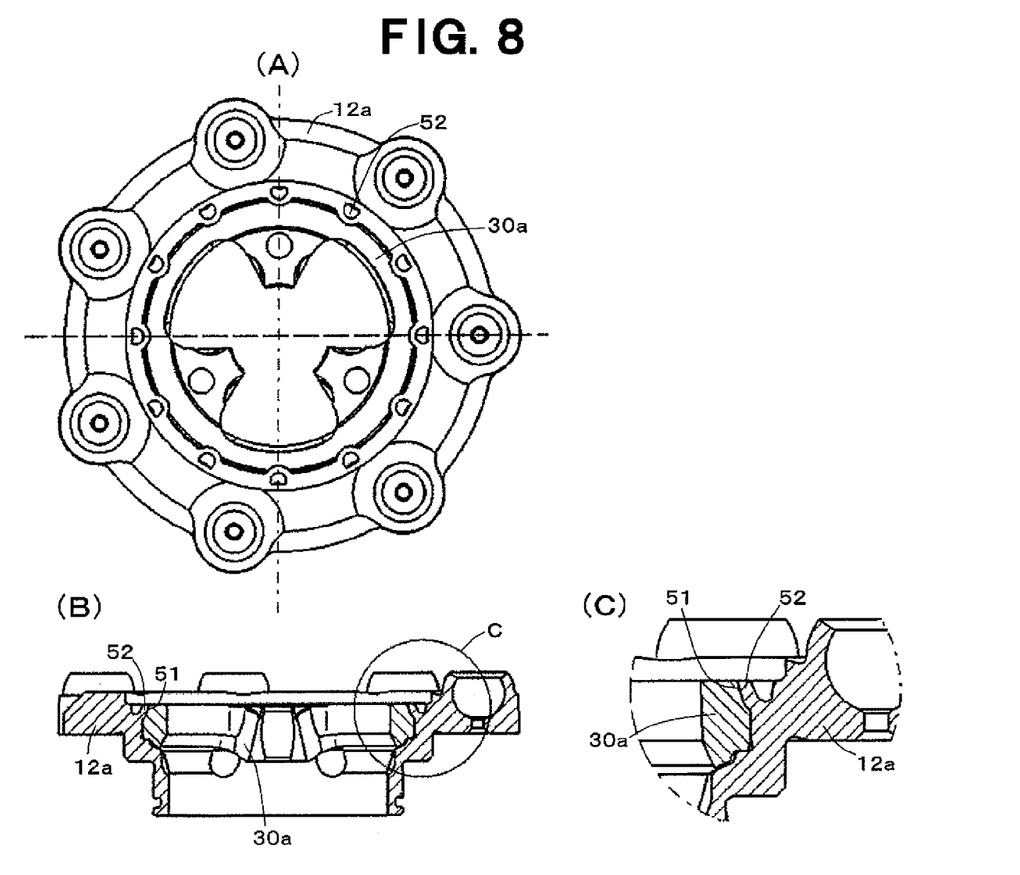

In the present invention, the connecting structure between wobble plate 12 in wobble plate rotation preventing mechanism 21 and outer ring 30 functioning as a wobble member for connecting the wobble plate 12 wobblingly is improved, for example, as shown in FIGS. 6 to 8. In the connecting structure according to this improvement, as shown in FIG. 6, a plurality of concave portions 51 arranged in the circumferential direction are provided on one member of outer ring 30a and wobble plate 12a (in the embodiment shown in the figure, on outer ring 30a). After outer ring 30a is fitted into the other member (in the embodiment shown in the figure, into wobble plate 12a), the wobble plate 12a is plastically deformed partially at locations corresponding to the above-described concave portions 51 so as to enter into the concave portions 51, as shown in FIG. 7, FIGS. 8 (A), (B) and (C). Namely, wobble plate 12a is caulked at locations corresponding to concave portions 51. Via this plastically deformed portions 52 (caulked portions), outer ring 30a and wobble plate 12a are fixed to each other in the axial direction and in the rotational direction, and both members are integrally connected and fixed to each other. Therefore, in this condition, at a state where the rotation of wobble plate 12a is prevented, the wobble plate 12a can be changed in inclination angle from the maximum inclination angle to the minimum inclination angle as shown in FIGS. 1 and 2.

In such a connecting and fixing structure between outer ring 30a and wobble plate 12a due to a plurality of concave portions 51 of outer ring 30a and local plastically deformed portions 52 (caulked portions) of wobble plate 12a, as compared with the connecting and fixing due to press fitting, because a high accuracy of the surface of the fitting portion is not required, the manufacture of parts can be facilitated, and the productivity can be improved. Further, since surface treatment for press fitting or re-processing after heat treatment can be made unnecessary, the whole of the manufacturing process may be simplified. Therefore, first, reduction of cost becomes possible, from the viewpoint of manufacture of parts and processing of parts. Further, because outer ring 30a and wobble plate 12a can be strongly connected and fixed to each other via the plastic deformation (caulking), a large fitting length becomes unnecessary between outer ring 30a and wobble plate 12a, the outer ring 30a, etc. may be formed as a thin member as shown in FIG. 6, and therefore, it becomes possible to make parts small-sized and reduce the weight. Also from this point of view, a further reduction in cost becomes possible. Furthermore, since the integrally fixing strength between both members may be increased by the connecting and fixing between outer ring 30a and wobble plate 12 via the plastic deformation (caulking), the durability of both members may be increased, and the rotation preventing function required to outer ring 30a and wobble plate 12a can be exhibited more surely.

Figure 9:
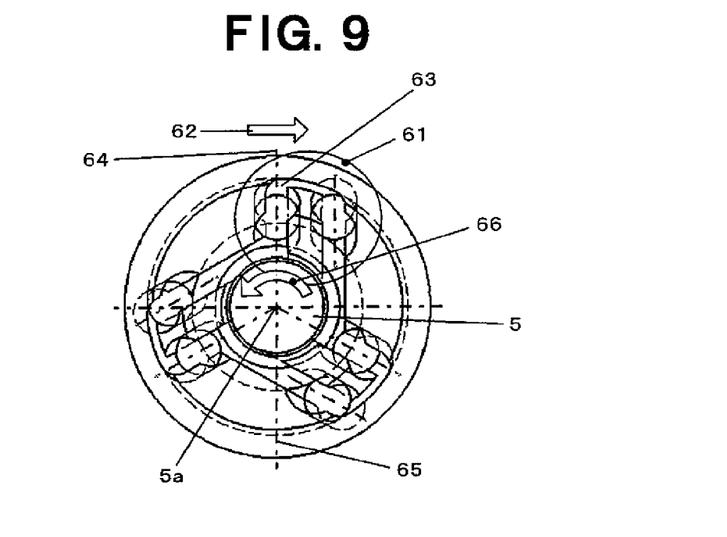
FIG. 9 is a partial elevational view showing a further example of the structure of the wobble plate type variable displacement compressor depicted in FIG. 1.

In the present invention, as an embodiment other than the embodiment depicted in FIGS. 1-5, for example, as depicted in FIG. 9, by offsetting one ball guide 63 mainly operating in power transmission direction of outer ring 62 among the pair of ball guides 61, in other words, axis 64 of the guide groove in the ball guide 63, onto plane 65 including center axis 5a of rotational main shaft 5, it is possible to further reduce the contact load in the specified restricted power transmission direction. Where, in FIG. 9, arrow 66 indicates power transmission direction of inner ring.

Figure 10:
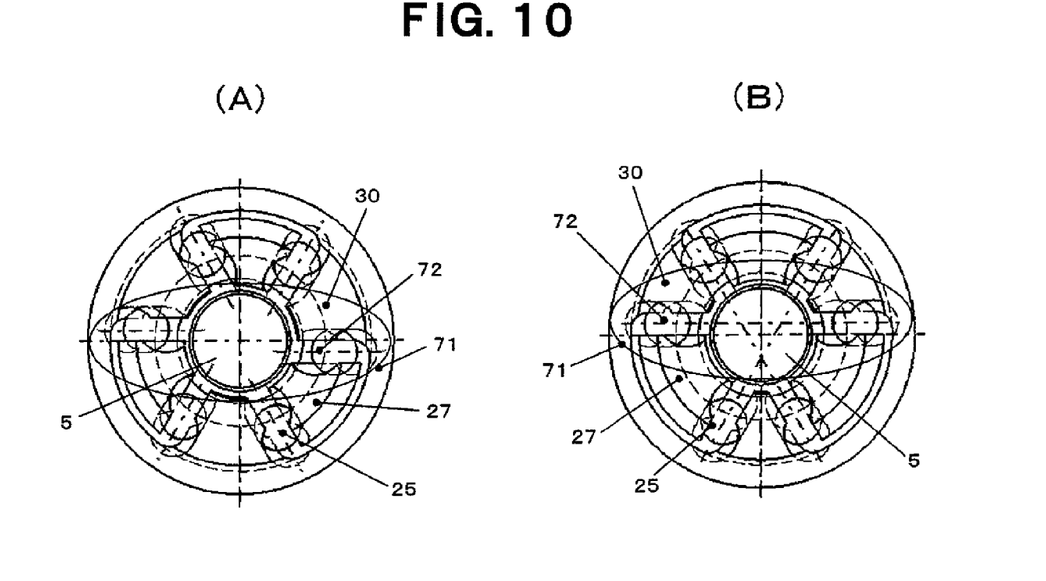
FIG. 10 shows partial elevational views showing further examples of the structure of the wobble plate type variable displacement compressor depicted in FIG. 1, and FIG. 10 (A) and FIG. 10 (B) show examples different from each other.

Further, as shown in FIG. 10 (A) or (B), a structure can also be employed wherein two ball guides disposed on both sides of rotational main shaft 5 approximately symmetrically relative to rotational main shaft 5 among a plurality of ball guides are referred to be a pair of ball guides, and the pair of ball guides 71 are disposed in parallel to each other, in other words, axes 72 of guide grooves formed on inner ring 27 and outer ring 30 forming the pair of ball guides 71 are disposed in parallel to each other. By this structure, because the play in the rotational direction in the rotation preventing mechanism portion is schematically decided by a relationship between the distance between a set of bottoms of the pair of guide grooves provided on inner and outer rings 27, 30 and the diameter of the balls, it becomes possible to set and manage the clearances in both ball guides simultaneously at desirable clearances, by disposing two ball guides, symmetrically disposed, in parallel to each other. Consequently, the setting and management of the clearances are facilitated, and it becomes possible to suppress the play to be small.

Figure 11:
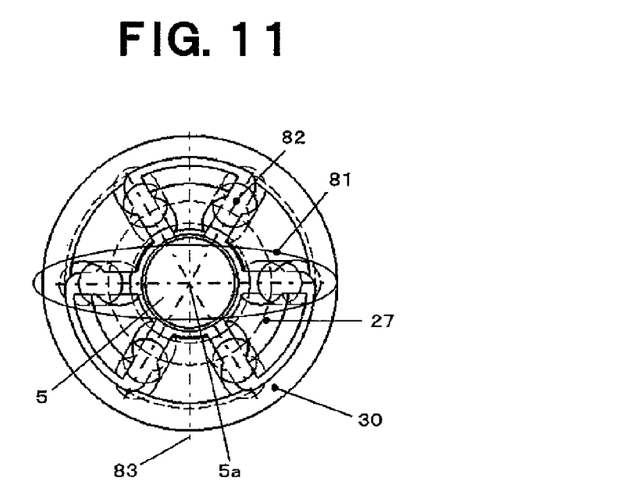
FIG. 11 is a partial elevational view showing a still further example of the structure of the wobble plate type variable displacement compressor depicted in FIG. 1.

Further, in this structure where the pair of ball guides are disposed in parallel to each other, as shown in FIG. 11, a structure can be employed wherein the pair of ball guides 81, which are disposed in parallel to each other, are disposed so that axes 82 of guide grooves forming the pair of ball guides are positioned on plane 83 including center axis 5a of rotational main shaft 5. In such a structure, the ball contact load is minimized without selecting the power transmission direction.

INDUSTRIAL APPLICATIONS OF THE INVENTION

The wobble plate type variable displacement compressor according to the present invention can be applied to a wobble plate type variable displacement compressor used in any field, and especially, it is suitable for use in the field for vehicles highly requiring making small-sized, increase of reliability, improvement of durability and silent performance, and cost down, in particular, for use in an air conditioning system for vehicles.

Explanation of Symbols

1: wobble plate type variable displacement compressor
2: housing
3: front housing
4: rear housing
5: rotational main shaft
5a: center axis
6: rotor
7: hinge mechanism
8: swash plate
9: cylinder bore
10: piston
11: connecting rod
12, 12a: wobble plate
13: suction chamber
14: valve plate
15: suction hole
16: discharge hole
17: discharge chamber
21: rotation preventing mechanism of wobble plate
22, 23, 29, 33: bearing (radial bearing)
24: sleeve
25: ball
26: guide groove of inner ring
27: inner ring
28: guide groove of outer ring
30, 30a: outer ring
31, 32: thrust bearing
41: ball guide
42, 43: axis of guide groove
44: plane passing through wobble center
45: pair of ball guides
46: axes of guide grooves formed on inner and outer rings
47: plane including center axis of rotational main shaft
51: concave portion
52: plastically deformed portion (caulked portion)
61: pair of ball guides
62: power transmission direction of outer ring
63: one ball guide
64: axis of guide groove
65: plane including center axis of rotational main shaft
66: power transmission direction of inner ring 71: pair of ball guides
72: axis of guide groove
81: pair of ball guides
82: axis of guide groove
83: plane including center axis of rotational main shaft

The invention claimed is:

1. A wobble plate type variable displacement compressor having pistons inserted reciprocally into cylinder bores, a swash plate rotated together with a rotational main shaft and supported changeably in angle relative to said main shaft, a wobble plate which is connected to said pistons, in which a rotational movement of said swash plate is converted into a wobble movement of said wobble plate, and which transmits said wobble movement to said pistons to reciprocate said pistons, and a rotation preventing mechanism of said wobble plate, characterized in that said rotation preventing mechanism of said wobble plate comprises (a) an inner ring provided in a housing movably in an axial direction while being prevented from rotation relative to the housing, the inner ring having a plurality of guide grooves for guiding a plurality of balls provided for force transmission, the inner ring being configured to move in the axial direction on the main shaft, (b) an outer ring having a plurality of guide grooves for guiding said balls at positions opposing respective guide grooves of said inner ring, and connected to said wobble plate on an outer circumference of said outer ring and supported wobblingly together with said wobble plate, (c) the plurality of balls being held by said guide grooves formed in said inner ring and said outer ring and performing force transmission by being held between said guide grooves which oppose each other, and (d) a sleeve functioning as a wobble central member of said wobble movement of said wobble plate, provided on said rotational main shaft to rotate relatively thereto and to move in an axial direction and engaged with said inner ring movably in an axial direction together with said inner ring, and said outer ring is supported wobblingly on said sleeve, and a structure for connecting said outer ring and said wobble plate is formed by providing a plurality of concave portions arranged in a circumferential direction on one member, plastically deforming the other member partially at locations corresponding to said concave portions so as to fit into said concave portions, and fixing both members to each other in an axial direction and in a rotational direction by means of said plastic deformation, said main shaft is rotatably supported within the housing, the housing having the cylinder bores at a rear end and an inboard support for the main shaft at a front end, wherein said guide grooves opposing each other of said inner ring and said outer ring of said wobble plate rotation preventing mechanism are formed at a relative angle of 30 to 60 degrees relative to a center axis of said rotational main shaft, and guide grooves opposing each other for forming a single ball guide are disposed so as to be symmetric relative to a plane perpendicular to said main shaft and passing through a wobble center of said wobble plate at a condition where a relative angle between an axis of said inner ring and an axis of said outer ring is zero.

2. The wobble plate type variable displacement compressor according to claim 1, wherein two ball guides adjacent to each other among a plurality of ball guides of said wobble plate rotation preventing mechanism are a pair of ball guides disposed in parallel to each other.

3. The wobble plate type variable displacement compressor according to claim 2, wherein said pair of ball guides disposed in parallel to each other are disposed symmetrically relative to a plane including a center axis of said rotational main shaft.

4. The wobble plate type variable displacement compressor according to claim 2, wherein a guide groove forming one ball guide of said pair of ball guides, which are disposed in parallel to each other, is disposed so that its axis is positioned on a plane including a center axis of said rotational main shaft.

5. The wobble plate type variable displacement compressor according to claim 1, wherein two ball guides disposed on both sides of said rotational main shaft approximately symmetrically relative to said rotational main shaft among a plurality of ball guides of said wobble plate rotation preventing mechanism are a pair of ball guides disposed in parallel to each other.

6. The wobble plate type variable displacement compressor according to claim 5, wherein said pair of ball guides, which are disposed in parallel to each other, are disposed so that axes of guide grooves forming said pair of ball guides are positioned on a plane including a center axis of said rotational main shaft.

7. The wobble plate type variable displacement compressor according to claim 1, wherein an inner diameter side of the inner ring has a spherical surface and an outer diameter side of the sleeve has a spherical surface, and the inner ring and the sleeve are mutually supported by engaging the spherical surface of the inner diameter side of the inner ring with the spherical surface of the outer diameter side of the sleeve so that there is a clearance between the spherical surfaces.

* * * * *